United States Patent
Luo et al.

(10) Patent No.: US 8,144,460 B2
(45) Date of Patent: Mar. 27, 2012

(54) PORTABLE COMPUTER WITH HEAT DISSIPATION UNIT

(75) Inventors: Ting Luo, Shenzhen (CN); Xian-Wei Ma, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 128 days.

(21) Appl. No.: 12/821,153

(22) Filed: Jun. 23, 2010

(65) Prior Publication Data
US 2011/0222236 A1    Sep. 15, 2011

(30) Foreign Application Priority Data
Mar. 12, 2010    (CN) .......................... 2010 1 0123732

(51) Int. Cl.
*H05K 7/20* (2006.01)

(52) U.S. Cl. ......... 361/679.47; 361/679.46; 361/679.54; 361/695; 361/704; 361/719; 165/80.3

(58) Field of Classification Search ........................ None
See application file for complete search history.

(56) References Cited

U.S. PATENT DOCUMENTS

| | | | | |
|---|---|---|---|---|
| 6,570,757 B2 * | 5/2003 | DiFonzo et al. | ......... | 361/679.27 |
| 6,648,064 B1 * | 11/2003 | Hanson | ......... | 165/120 |
| 6,900,985 B2 * | 5/2005 | Chen et al. | ......... | 361/704 |
| 7,417,864 B2 * | 8/2008 | Barsun et al. | ......... | 361/719 |
| 7,492,592 B2 * | 2/2009 | Ye et al. | ......... | 361/695 |
| 7,542,290 B2 * | 6/2009 | Tracy et al. | ......... | 361/696 |
| 7,852,628 B2 * | 12/2010 | Hirohata et al. | ......... | 361/695 |
| 7,929,292 B2 * | 4/2011 | Li et al. | ......... | 361/679.46 |

* cited by examiner

*Primary Examiner* — Boris Chervinsky
(74) *Attorney, Agent, or Firm* — Altis Law Group, Inc.

(57) ABSTRACT

A portable computer includes a shell, a printed circuit board in the shell, a heat generating element, a heat conducting sheet, a primary heat dissipation unit, a subsidiary heat dissipation unit, and a heat-transfer unit. The heat generating element is electronically connected on the printed circuit board. The heat conducting sheet is positioned on the heat generating element. The heat-transfer unit includes a heat-transfer member and a drive unit. The heat-transfer member connects to the heat conducting sheet. The drive unit moves the heat-transfer member to connect with the primary heat dissipation unit or the subsidiary heat dissipation unit.

8 Claims, 5 Drawing Sheets

PORTABLE COMPUTER WITH HEAT DISSIPATION UNIT

BACKGROUND

1. Technical Field

The present disclosure relates to portable computers, especially to a portable computer with a heat dissipation unit.

2. Description of Related Art

Components of portable computers, especially central processing units (CPU) and north bridges, generate a lot of heat when working. Usually portable computers include heat sinks for dissipating heat. Yet, the heat dissipated by the heat sink is limited, over a long time, the temperature of the heat sink may increase to a point that the heat-transfer efficiency will decrease. Thus, the temperature of the portable computer increases gradually and affects the operation of the portable computer.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
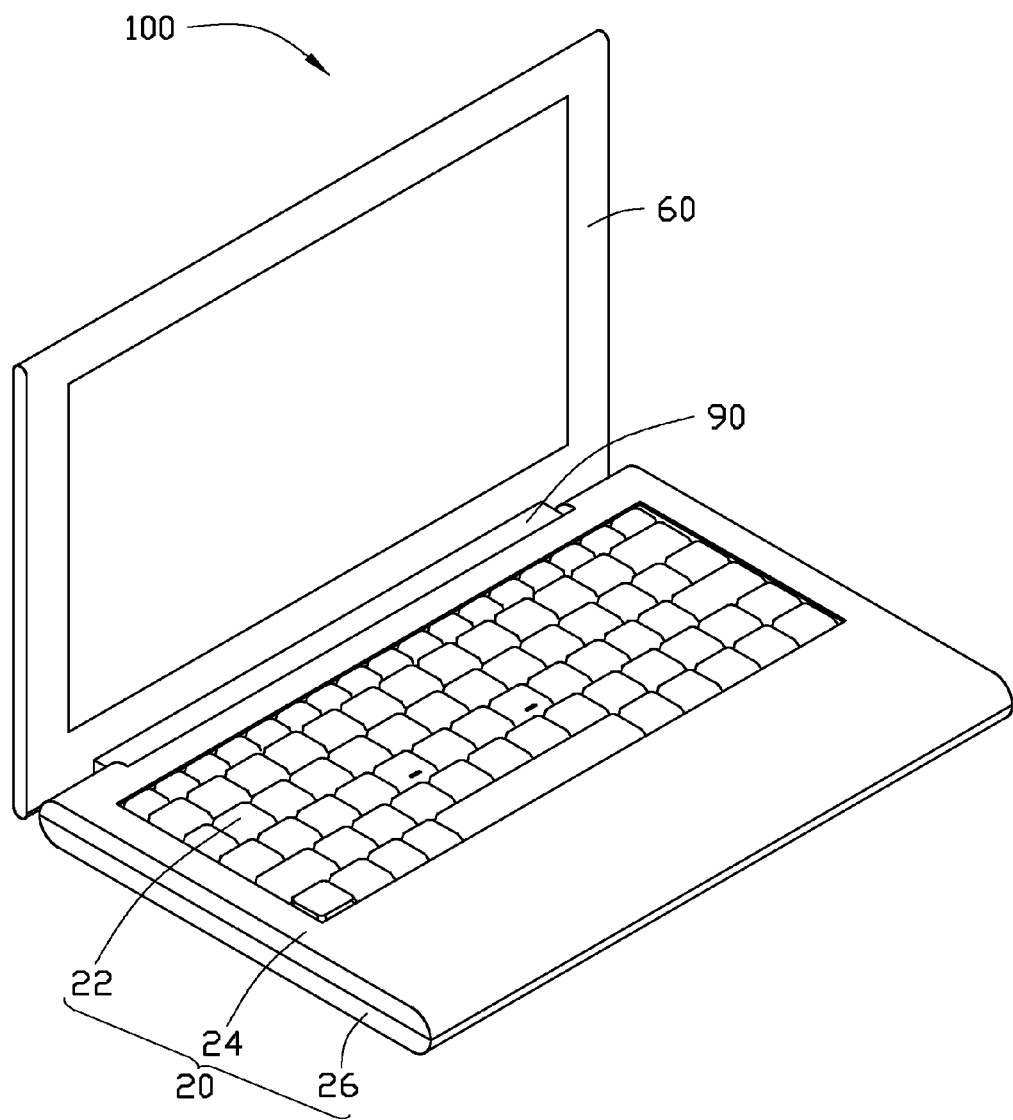
FIG. 1 is an isometric view of a portable computer according to an exemplary embodiment.

Referring to FIG. 1, a portable computer 100 according to an exemplary embodiment is shown. The portable computer 100 includes a main body 20, a cover 60 and a pivot 90 rotatably connecting the main body 20 to the cover 60. The main body 20 includes a keyboard 22, a top shell 24 defines a hole that exposes the keyboard 22 and a bottom shell 26 clasped to the top shell 24.

Figure 2:
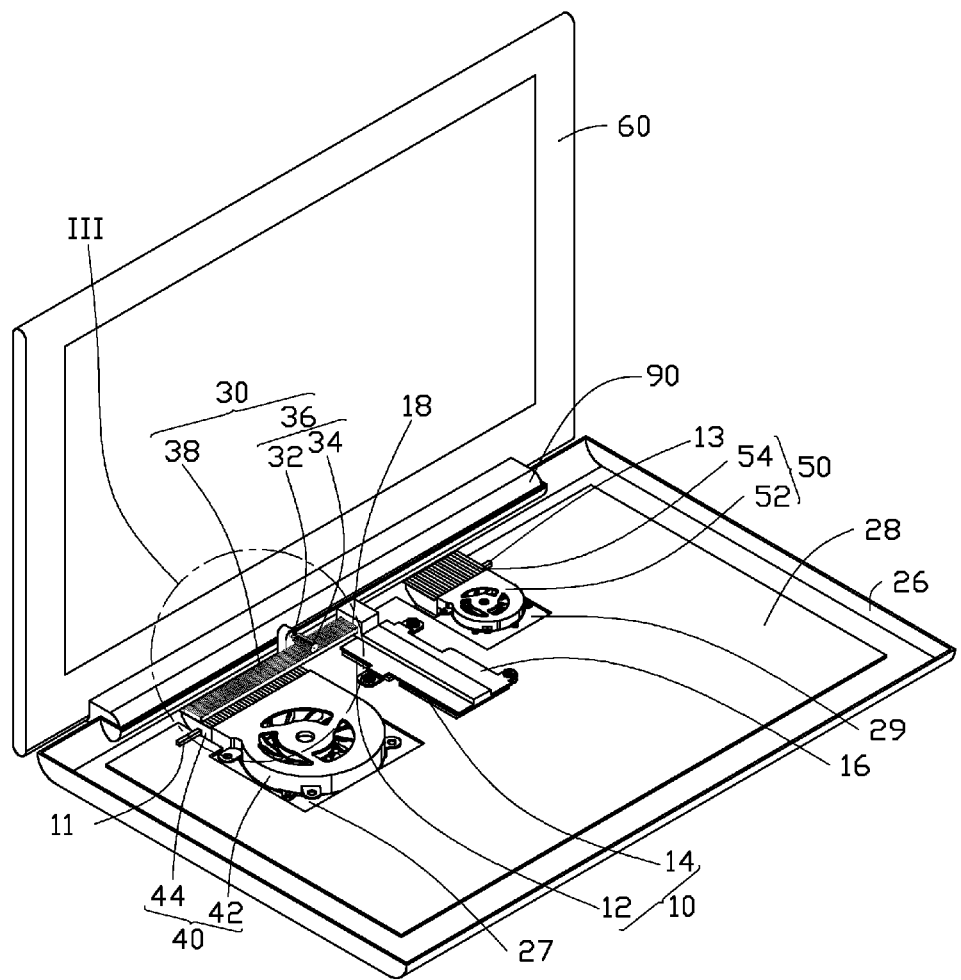
FIG. 2 is an isometric view of the portable computer in FIG. 1, with a top shell removed, showing primary heat dissipation unit components.
Figure 4:
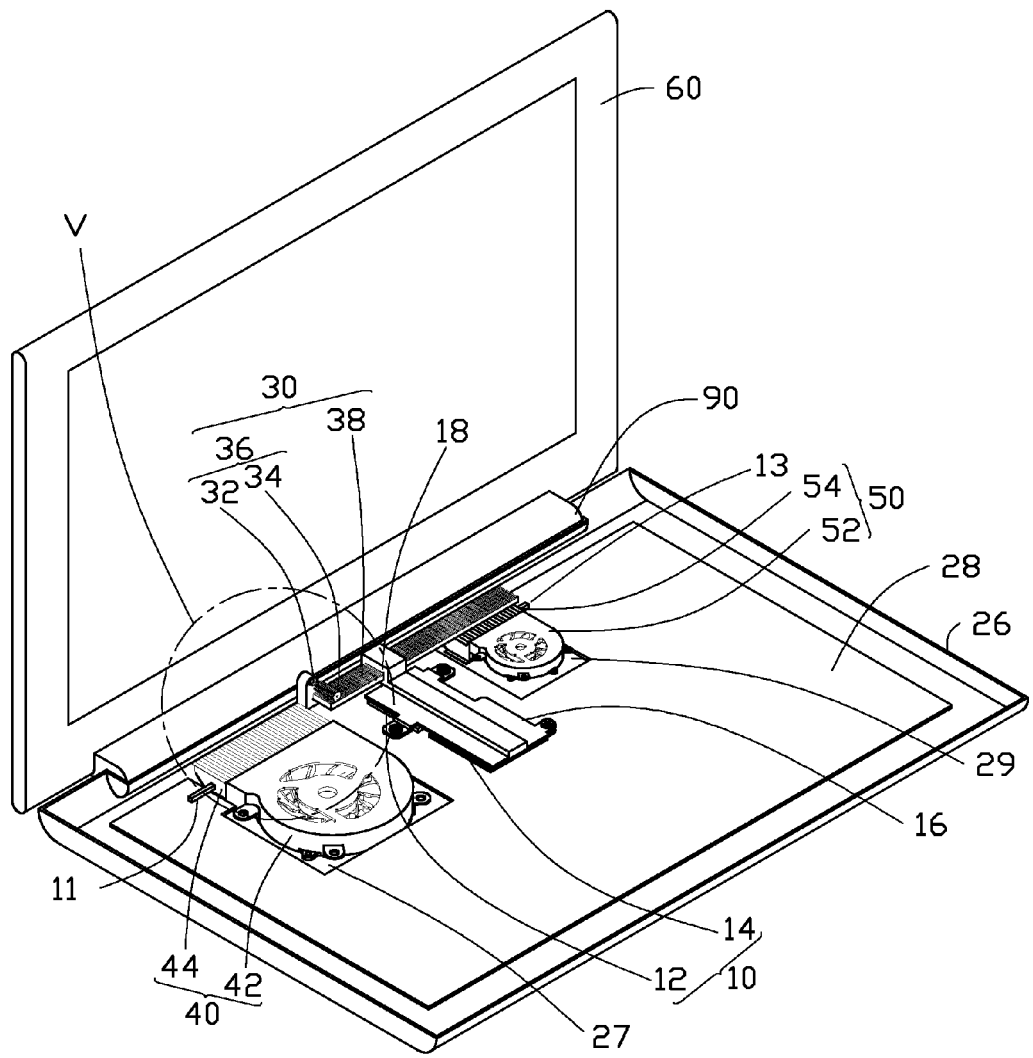
FIG. 4 is similar to FIG. 2, but showing subsidiary heat dissipation unit components.

Referring to FIGS. 2 and 4, the portable computer 100 further includes a printed circuit board 28, a heat generating element 10, a heat conducting sheet 16, a heat-transfer unit 30, a primary heat dissipation unit 40, a subsidiary heat dissipation unit 50, a first temperature sensor 11 and a second temperature sensor 13. The printed circuit board 28, the heat-transfer unit 30, the primary heat dissipation unit 40 and the subsidiary heat dissipation unit 50 are installed in the bottom shell 26. The heat generating element 10 electronically couples on the printed circuit board 28 and includes a central processing unit (CPU) 12 and a north bridge 14. The heat conducting sheet 16 is disposed on the heat generating element 10 for absorbing heat generated by the heat generating element 10 at work. The first temperature sensor 11 and the second temperature sensor 13 are used for detecting temperature of the primary heat dissipation unit 40 and subsidiary heat dissipation unit 50 respectively. According to the detected results of the first temperature sensor 11 and the second temperature sensor 13, the heat-transfer unit 30 moves to connect the heat conducting sheet 16 to the primary heat dissipation unit 40, thus transfers the heat to the primary heat dissipation unit 40, or connects the heat conducting sheet 16 to the subsidiary heat dissipation unit 50, thus transfers the heat to the subsidiary heat dissipation unit 50.

The printed circuit board 28 defines a first space 27 and a second space 29 positioned adjacent two opposite sides of the heat conducting sheet 16. The first space 27 and the second space 29 are configured for receiving the primary heat dissipation unit 40 and the subsidiary heat dissipation unit 50 respectively.

The primary heat dissipation unit 40 is received in the first space 27 and fixed on the bottom shell 26. The primary heat dissipation unit 40 includes a primary fan 42 and primary heat sink fins 44 facing an outlet vent of the primary fan 42.

The subsidiary heat dissipation unit 50 is received in the second space 29 and fixed on the bottom shell 26. The subsidiary heat dissipation unit 50 includes a subsidiary fan 52 and subsidiary heat sink fins 54 facing an outlet vent of the subsidiary fan 52.

The heat conducting sheet 16 defines a through hole 18 for receiving the heat-transfer unit 30.

The heat-transfer unit 30 includes a heat-transfer member 38 partly received in the through hole 18 and a drive unit 36. The drive unit 36 is configured to drive the heat-transfer member 18 to move back and forth along the through hole 18. The drive unit 36 includes a motor 32 fixed to the bottom shell 26 and a gear 34 connecting to the motor 32. The motor 32 electronically connects to the CPU 12 and the CPU 12 controls the motor 32 to rotate clockwise or counterclockwise. The heat-transfer member 38 is a long sheet and defines teeth on the surface facing the gear 34 for meshing with the gear 34. When the motor 32 rotates, the motor 32 drives the gear 34, the gear 34 drives the heat-transfer member 38 to move along the through hole 18 to seat on the subsidiary heat sink fins 54 or the primary heat sink fins 44.

Figure 3:
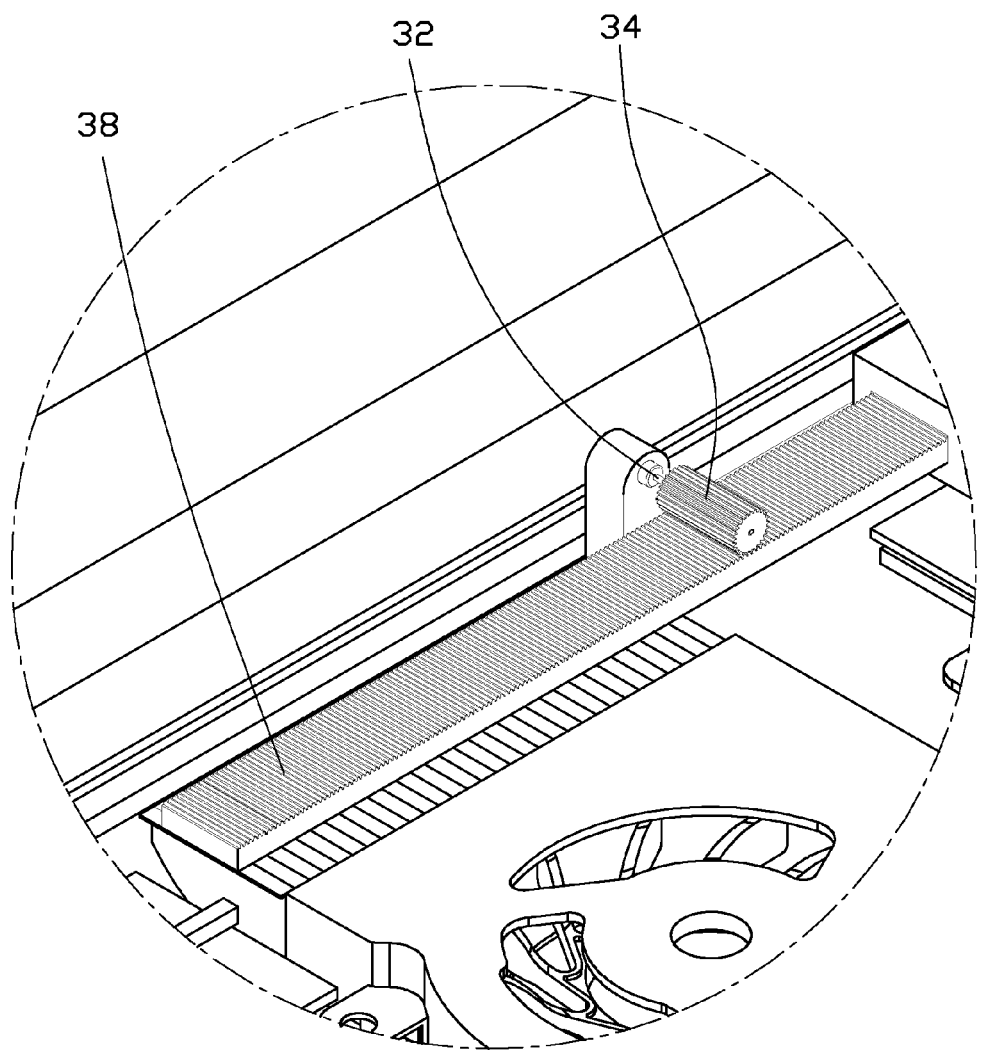
FIG. 3 is an enlarged view of III of the portable computer in FIG. 2.
Figure 5:
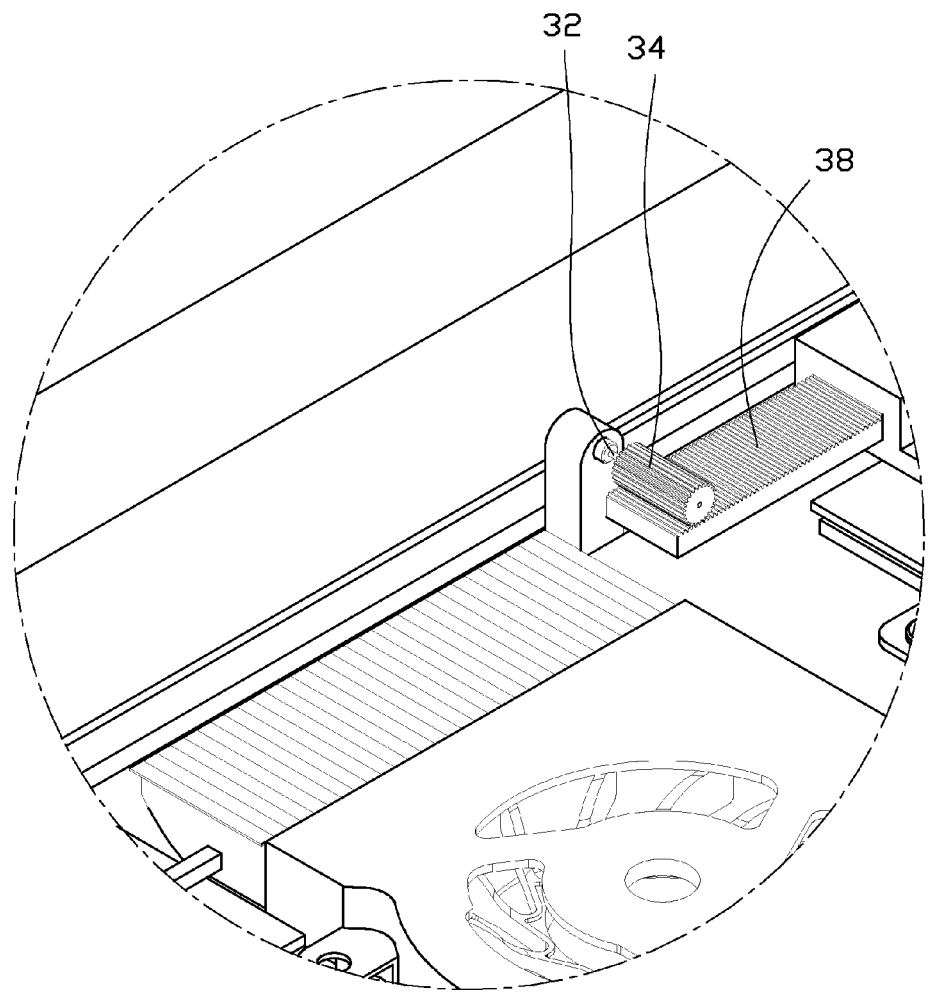
FIG. 5 is an enlarged view of V of the portable computer in FIG. 4.

Referring to FIGS. 2 and 3, which shows the heat-transfer member 38 is positioned on the primary heat sink fins 44. The CPU 12 and the north bridge 14 generates heat during operation, the heat conducting sheet 16 absorbs the heat, the heat-transfer member 38 transfers the heat to the primary heat sink fins 44 for dissipating the heat by the primary fan 42. But the primary fan 42 cannot completely dissipate the heat timely, thus, the temperature of the primary heat sink fins 44 will increase gradually. Referring also to FIGS. 4 and 5, when the first temperature sensor 11 detects the temperature of the primary heat sink fins 44 reaches a first predetermined value, the CPU 12 controls the motor 32 to rotate clockwise. Correspondingly the motor 32 drives the gear 34 to impel the heat-transfer member 38 to move toward the subsidiary heat dissipation unit 50 along the through hole 18.

When the heat-transfer member 38 reaches the subsidiary heat dissipation unit 50, the heat-transfer member 38 transfers the heat absorbed by the heat conducting sheet 16 to the subsidiary heat sink fins 54 for dissipating the heat by the subsidiary fan 52. At the beginning, the temperature of the subsidiary heat sink fins 54 is lower than that of the primary heat sink fins 44, the difference in temperature of the heat-transfer member 38 and the subsidiary heat sink fins 54 is bigger, therefore the heat is dissipates more quickly.

When the second temperature sensor 13 detects the temperature of the subsidiary heat sink fins 54 reaches a second predetermined value, the CPU 12 controls the motor 32 to rotate counterclockwise. Correspondingly the motor 32 drives the gear 34 to impel the heat-transfer member 38 to move toward the primary heat dissipation unit 40 along the through hole 18. When the heat-transfer member 38 reaches the primary heat dissipation unit 40, the heat is dissipated by the primary heat dissipation unit 40. The gear 34 alternates the heat-transfer member 38 back and forth from the primary heat sink fins 44 to the subsidiary heat sink fins 54 in turns for dissipating the heat.

It is to be understood, however, that even though numerous characteristics and advantages of the present disclosure have been set forth in the foregoing description, together with details of the structure and function of the present disclosure, the present disclosure is illustrative only, and changes may be made in details, especially in matters of shape, size, and arrangement of parts within the principles of the present disclosure to the full extent indicated by the broad general meaning of the terms in which the appended claims are expressed.

What is claimed is:

1. A portable computer comprising:
   a shell;
   a printed circuit board received in the shell;
   a heat generating element electronically connected with the printed circuit board;
   a heat conducting sheet positioned on the heat generating element;
   a primary heat dissipation unit;
   a subsidiary heat dissipation unit; and
   a heat-transfer unit comprising a heat-transfer member and a drive unit, wherein the heat-transfer member connects to the heat conducting sheet, the drive unit moves the heat-transfer member to connect with the primary heat dissipation unit or the subsidiary heat dissipation unit.

2. The portable computer of claim 1, further comprising a first temperature sensor configured for detecting the temperature of the primary heat dissipation unit, when the temperature of the primary heat dissipation unit reaches a first predetermined value, the drive unit moves the heat-transfer member to connect with the subsidiary heat dissipation unit.

3. The portable computer of claim 2, further comprising a second temperature sensor configured for detecting the temperature of the subsidiary heat dissipation unit, when the temperature of the subsidiary heat dissipation unit reaches a second predetermined value, the drive unit moves the heat-transfer member to connect with the primary heat dissipation unit.

4. The portable computer of claim 1, wherein the heat conducting sheet defines a through hole, the heat-transfer member is seated in the through hole and moves along the through hole.

5. The portable computer of claim 4, wherein the drive unit includes a motor fixed to the shell and a gear connected to the motor, the heat-transfer member defines teeth configured for meshing with the gear, the motor drives the gear and the gear impels the heat-transfer member to move along the through hole.

6. The portable computer of claim 1, wherein the primary heat dissipation unit comprises a primary fan and primary heat sink fins facing an outlet vent of the primary fan, the drive unit drives the heat-transfer member to move on the primary heat sink fins.

7. The portable computer of claim 1, wherein the subsidiary heat dissipation unit comprises a subsidiary fan and subsidiary heat sink fins facing an outlet vent of the subsidiary fan, the drive unit drives the heat-transfer member to move on the subsidiary heat sink fins.

8. The portable computer of claim 1, wherein the heat generating element comprises a central processing unit and a north bridge.

* * * * *